(No Model.)
C. G. LUNDBORG.
SPRING SCALES.
No. 422,238. Patented Feb. 25, 1890.
Fig. 1.
Fig. 2.
on line x-x
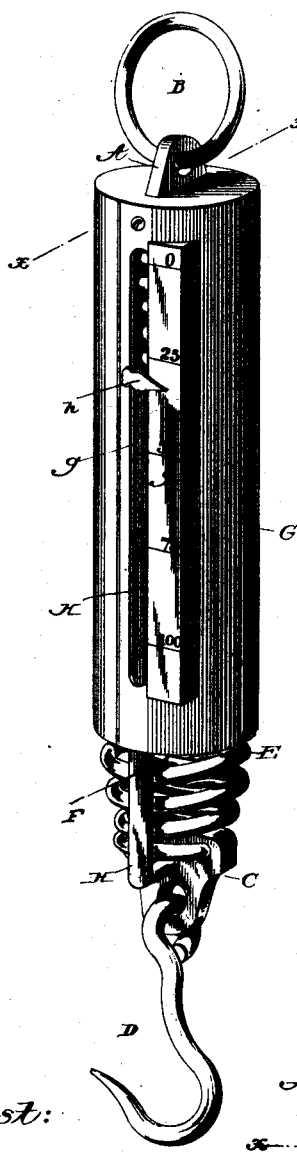
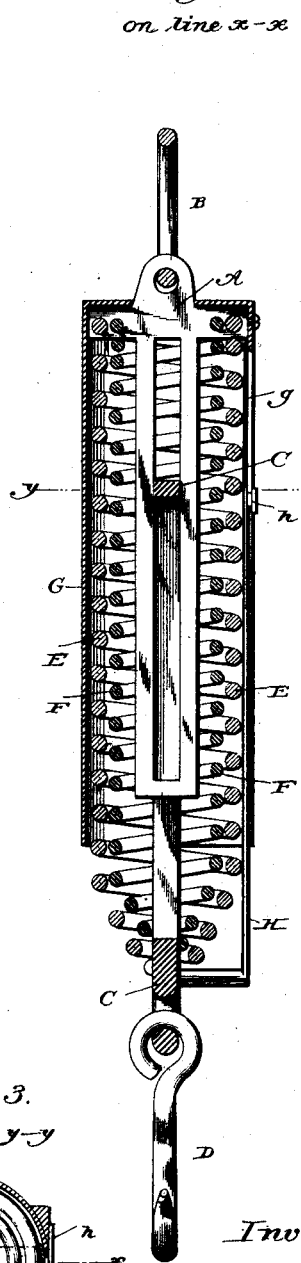
Fig. 3.
on line y-y
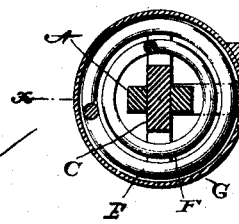
Attest:
W. W. Mortimer
N. A. Kennedy
Inventor:
C. G. Lundborg
By his Atty
Phil. T. Dodge

UNITED STATES PATENT OFFICE.

CHARLES G. LUNDBORG, OF NEW YORK, N. Y.

SPRING-SCALES.

SPECIFICATION forming part of Letters Patent No. 422,238, dated February 25, 1890.

Application filed July 1, 1889. Serial No. 316,185. (No model.)

*To all whom it may concern:*

Be it known that I, CHARLES G. LUNDBORG, of the city of New York, in the county of New York and State of New York, have invented certain Improvements in Spring-Scales, of which the following is a specification.

The object of my invention is to provide a simple and inexpensive scale which shall be less liable than those in common use to be rendered inaccurate by the "settling" of the spring.

In the accompanying drawings, Figure 1 is a perspective view of a scale constructed on my plan. Fig. 2 is a longitudinal vertical section of the same on the line $x\,x$, Figs. 1 and 3. Fig. 3 is a cross-section on the line $y\,y$, Fig. 2.

Referring to the drawings, A represents a longitudinally-slotted bar or link having its upper end enlarged and provided with a ring B or equivalent means of suspension.

C represents a second slotted bar or link having one end passed through the link A, as shown, so that it may slide endwise thereof a distance equal to the length of the slots. A hook D or other means for supporting the load is attached to the lower end of link C.

E and F are two concentric reversely-wound helical springs applied around the links, their upper ends attached to the top of link A and their lower ends secured to the lower end of link C. In this manner the springs are caused to sustain the link C and to hold the same normally at its highest elevation.

A weight applied to the hook D, drawing the link C downward, distends the springs; but in the event of an excessive load being applied the distention is limited by the two links, so that the breakage of the springs or a distention so great as to cause a permanent set are avoided.

G is a tubular jacket or casing inclosing the springs and secured at its upper end to the link A. It is provided in one side with a vertical slot $g$, and adjacent to this slot with suitable marks or graduations $g'$ to indicate the weight of the load. An arm H is fixed to the lower end of the link C, extending thence upward outside of the springs, but within the casing G, provided with a protruding pointer $h$, which indicates upon the scale $g$ the weight of the load.

The form of the links and the casing may be modified and the ends of the springs may be secured to the links in any suitable manner. I prefer, however, to pass them through holes in the links, as shown in the drawings, and secure them by brazing.

When the springs are elongated, they have a tendency to uncoil. In order to prevent this uncoiling action, due to the torsional strain on the spring, from causing the parts to bind or otherwise affect the accuracy of the scale, I employ two springs wound in reverse directions, and in constructing the springs I observe special care to see that they are of such relative strength and size that the tendency of one to unwind will be neutralized or counterbalanced by the like tendency of the other. I find that this result is best secured by constructing one spring of lighter or smaller wire than the other.

Having thus described my invention, what I claim is—

1. In a spring-scale, the combination of two concentric reversely-wound helical springs, a suspending device attached to the upper end of the two springs, a suspending device attached to the lower end of the two springs, an arm or pointer attached to the one suspending device, and a scale attached to the other suspending device.

2. In a spring-scale, the combination of two co-operating links to limit the extension of the springs, two reversely-wound concentric helical springs, each connected firmly to the two links, a scale or indicator attached to one of said links, and an arm or pointer attached to the other.

3. In a spring-scale, the link A, provided with a suspending device, the link C, the concentric helical springs E and F, both attached rigidly at their upper ends to link A and at their lower ends to link C, the jacket G, attached to the upper link and provided with graduations, and the arm H, attached to the lower link, said elements combined as described and shown.

4. In a spring-scale, the combination of two reversely-wound helical springs mounted one within the other and firmly united at their two ends, the one spring of lighter or smaller metal than the other.

In testimony whereof I hereunto set my hand, this 7th day of June, 1889, in the presence of two attesting witnesses.

CHARLES G. LUNDBORG.

Witnesses:
 GUST. A. PETERSON,
 P. G. WESTERBERG.